July 8, 1930. K. C. LIVERMORE Re. 17,727

TWO-WAY PLOW

Original Filed Sept. 20, 1920 3 Sheets-Sheet 1

Witness

Milton Lenoir

Inventor.

Kenneth C. Livermore,

By Brown, Jackson, Boettcher & Dienner.

Attorneys

July 8, 1930. K. C. LIVERMORE Re. 17,727
TWO-WAY PLOW
Original Filed Sept. 20, 1920 3 Sheets-Sheet 2
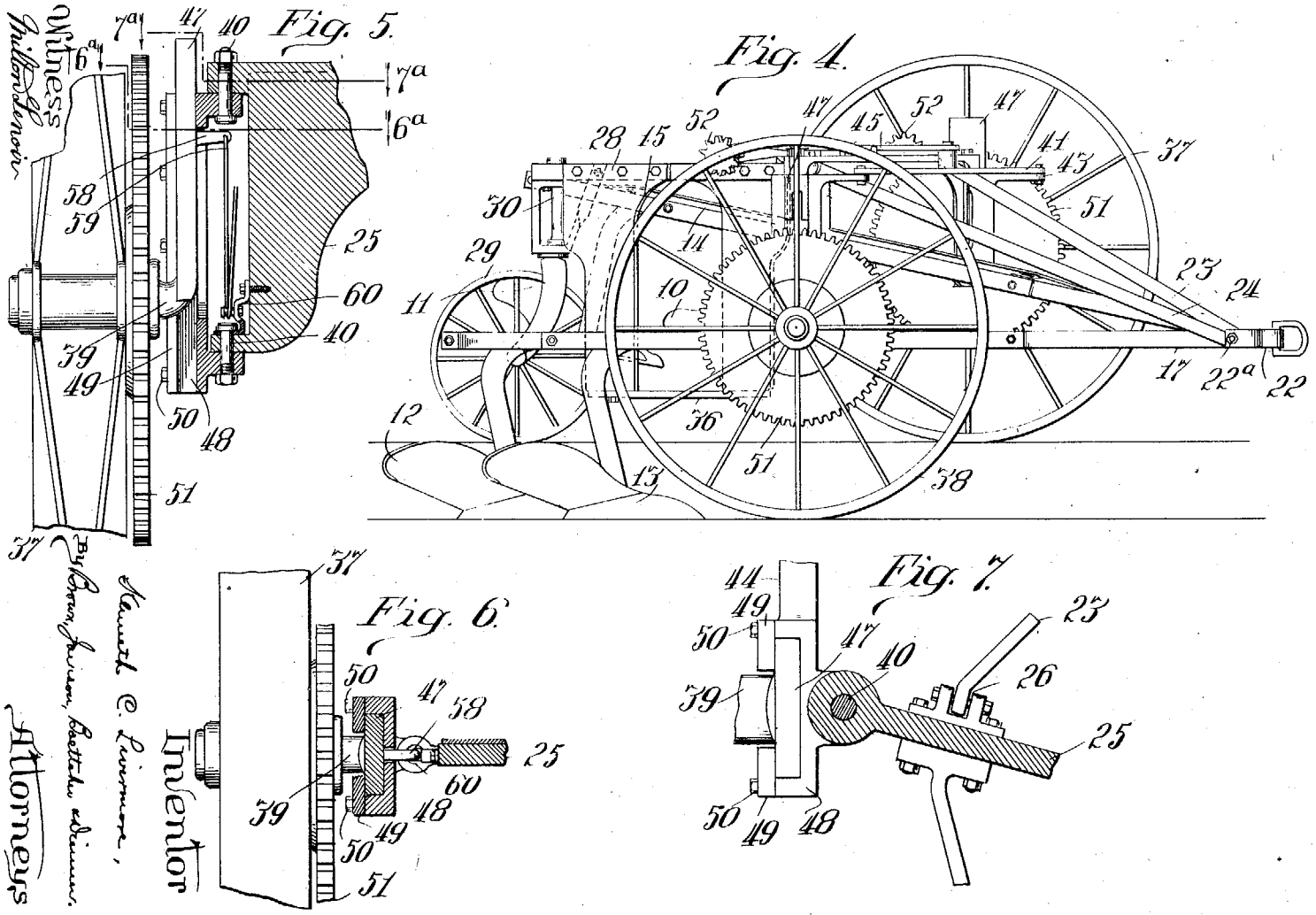
Witness
Milton Lenoir
Inventor
Kenneth C. Livermore,
By Brown, Jackson, Boettcher & Dienner.
Attorneys July 8, 1930. K. C. LIVERMORE Re. 17,727

TWO-WAY PLOW

Original Filed Sept. 20, 1920 3 Sheets-Sheet 3

Witness
Milton Lewis

Inventor
Kenneth C. Livermore,
By Brown, Jackson, Boettcher & Dienner.
Attorneys Reissued July 8, 1930 Re. 17,727

UNITED STATES PATENT OFFICE

KENNETH C. LIVERMORE, OF HONEOYE FALLS, NEW YORK, ASSIGNOR TO SYRACUSE CHILLED PLOW CO., INC., A CORPORATION OF NEW YORK

TWO-WAY PLOW

Original No. 1,666,016, dated April 10, 1928, Serial No. 411,558, filed September 20, 1920. Application for reissue filed July 13, 1928. Serial No. 292,392.

This invention relates to ground working tools, such for example, as plows and similar tools adapted to turn over the soil. The object of my invention is to provide a means whereby plows and similar ground working tools may be drawn with the greatest facility, minimum of resistance and certainty of correct alinement, which means is particularly adapted for use with a plurality of independently operable tools such as two-way plows. To these and other ends the invention resides in certain improvements and combinations as will be hereinafter more fully described, the novel features being pointed out in the claims at the end of the specification.

In the drawings:

Figure 4 is a side view of Figure 1.

Figure 5 is a detail of the wheel elevating mechanism.

Figure 6 is a section on the line $6^a$—$6^a$ of Figure 5.

Figure 7 is a section on the line $7^a$—$7^a$ of Figure 5.

Similar reference characters through the several views indicate the same parts.

Figure 1:
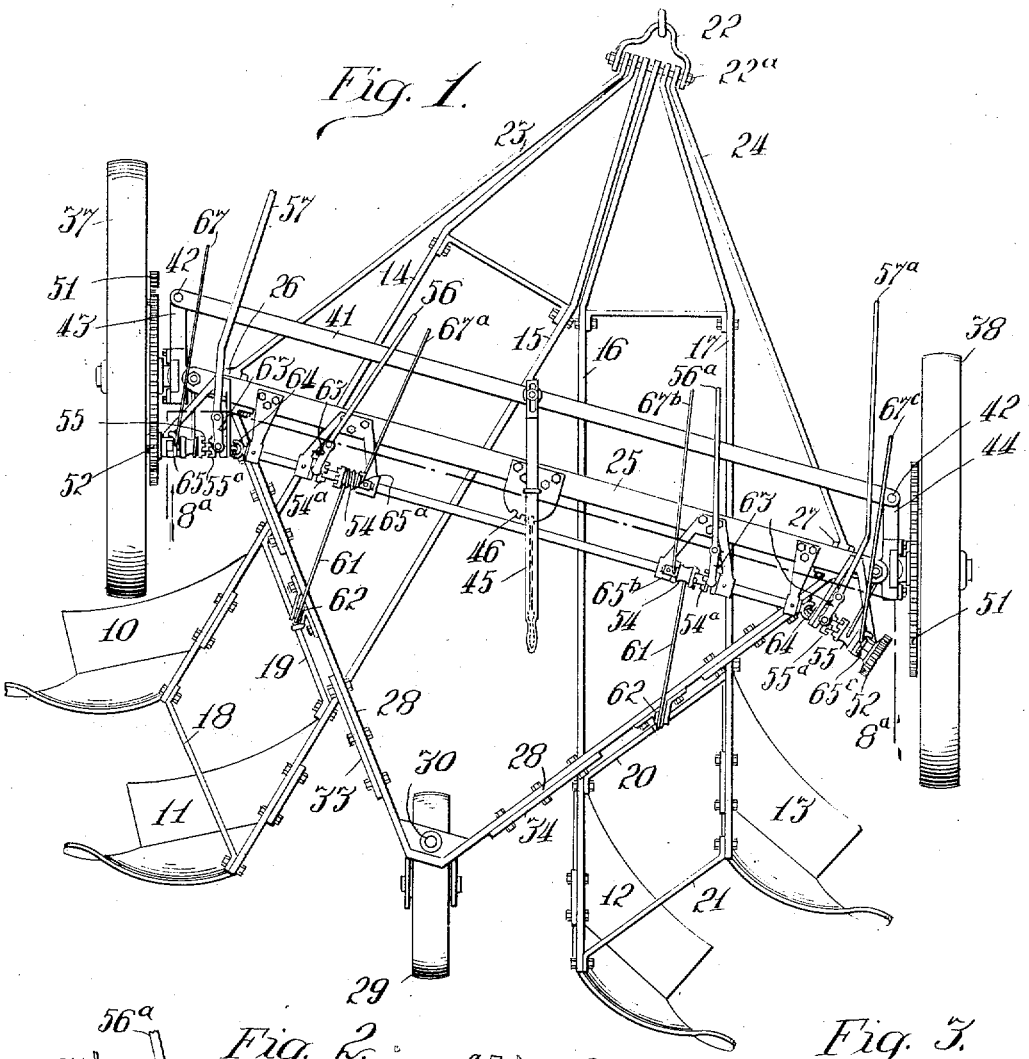
Figure 1 is a plan view of a two-way gang plow with the right hand gang in operative position.
Figure 2:
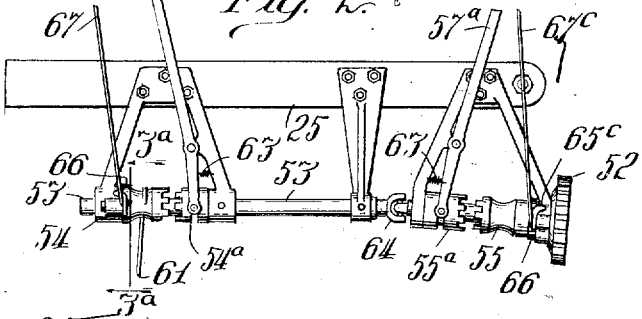
Figure 2 is an enlargement of the right hand end of the cross member and adjusting shaft.
Figure 3:
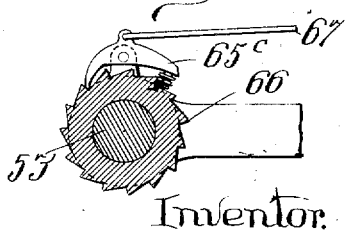
Figure 3 is a section on the line $3^a$—$3^a$ of Figure 2.

In the drawings 10 and 11 are plows which constitute one set while 12 and 13 constitute the other set, rigidly secured to separate plow carrying frames one of which comprises the parts 14, 15, 18 and 19 and the other the parts 16, 17, 20 and 21. As shown, each set or gang of plows is arranged at a fixed horizontal rearwardly divergent angle with the other and is pivotally secured to the horizontal draw pin $22^a$ to which is attached the attaching member or single point of attachment 22 of the drawing force of the machine. Thus the gangs may swing vertically in rearwardly divergent planes into or out of operative position independently of each other. Suitable side bars 23 and 24 are pivotally secured at 26 and 27 to the arched cross member 25 or main frame of the machine to swing vertically but not laterally relatively thereto, and support the draw pin $22^a$ at their converging front ends so that said bars cause fixed point of attachment 22 to be always in a fixed angular relation to the two sets of plows and yet permit the point 22 to raise or lower with any unevenness of the ground. The side bars 23, 24, with the draw pin $22^a$ which connects them, constitute a fore or draft frame by which the draft of the tractor or other drawing power is transmitted to the main frame and to the plow units.

In the construction illustrated a rear frame is provided, which comprises the side bars 28 fixedly secured to the cross member or main frame 25 and carries a rear supporting wheel in the form of a caster wheel 29 pivotally mounted at 30, so that such wheel may always be automatically alined with the direction of movement of the machine.

Figure 8:
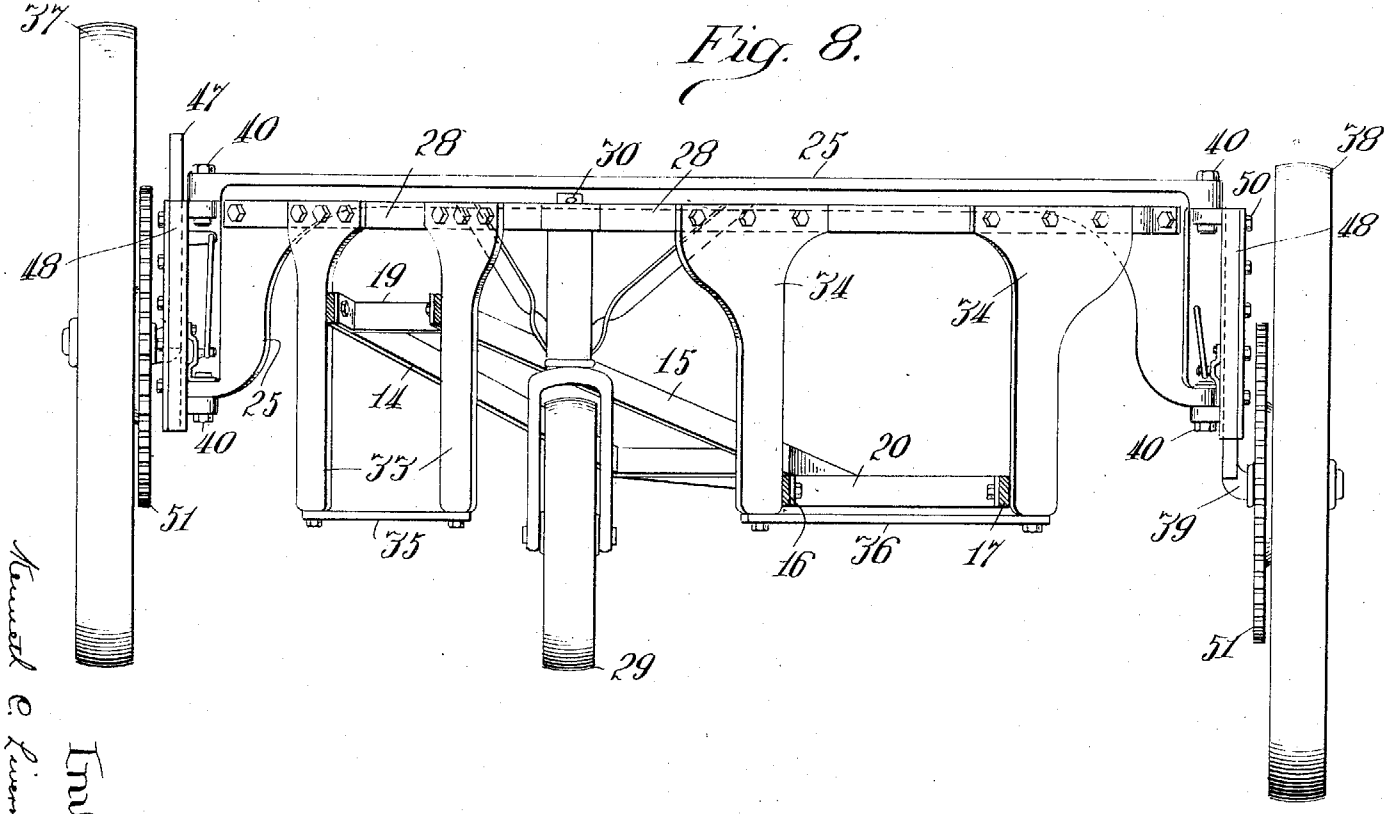
Figure 8 is a rear view of the main frame with parts broken away.

Depending from the side bars 28 of the rear frame are the guide aprons 33 and 34, shown in Figure 8, between the bottom edges of which are secured the strengthening and supporting pieces 35 and 36 which prevent the operative plow from digging into the ground any more than a maximum amount below the main frame should there be any tendency thereto.

The depth of the furrow is regulated by the height of or the adjustment of the main side supporting wheels 37 and 38, which are dirigible, and are separately vertically adjustable by having the axle 39 of each wheel bent around to constitute a vertical or upstanding portion 47 slidable in the guide channels 48 provided with securing pieces 49 and bolts 50 to hold the upstanding projections 47 in place in the guide channels. The dirigible wheels 37 and 38 are always in parallelism and are pivotally secured to the arched main frame or cross member 25 by means of the pins 40 at each end thereof. In order to dispose these dirigible side wheels at different angles relative to the cross or transverse member 25, an auxiliary bar 41 is pivoted at each of its ends at 42 to the projecting arms 43 and 44 fixed to the guide channels 48.

For purposes of adjusting the wheels at the desired angle to the main frame, a handle 45 is secured to the auxiliary bar 41 and pivotally attached to the cross member 25 and cooperates with notches 46 in a plate attached to the main frame in order to hold the handle 45 and the side wheels 37 and 38 movable therefrom in the angularly adjusted position. In the embodiment shown there are only three positions illustrated for the wheels, the mid-position with which the handle 45 cooperates when the wheels are substantially at right angles to the cross member 25 for drawing the plow with neither set of tools in operative position, the left hand notch with which the handle 45 cooperates when the plows 10 and 11 are in operative position, and the right hand notch in which the handle is shown cooperating when the right hand gang is in working position.

Each of the side wheels 37 and 38 has fixedly secured thereto to rotate and also to turn angularly therewith, power transmitting means in the form of a large driving gear 51, one of which is adapted to cooperate with one of the driven gears 52 when either gang of plows is working. The driven gear 52 drives the adjusting shaft 53 which is fixed relative to the transverse arched or cross member 25 and contains the universal joints 64 necessitated by the angular disposition of the ends of the shaft. Provided on the adjusting shaft 53 but freely rotatable thereon are the winding drums 54 and 55 for independently elevating either wheel or moving either gang of plows to an inoperative position.

These winding drums may be rotated by means of the complementary cooperating clutch members 54ᵃ and 55ᵃ, each of which is keyed to the shaft 53 but slidable thereon by means of the operating levers 56, 56ᵃ, 57 and 57ᵃ respectively, which may lead to a position adjacent the driver's seat if the device is used as a sulky plow, or may lead to the operator's position if tractor drawn. In order to raise or lower each wheel, a lug 58 projects from the upstanding portion 47 of the axle through the back of the guide channel 48 to which is attached a chain or cable 59 passing downwardly over a pulley or sheave 60 fixed to the main frame and upward to the winding drum 55. For lifting either set of plows out of operative position, a chain or cable 61 passes over each winding drum 54 to the pulley 62 and down to the cross pieces 19 and 20 to which the lower end of the cable may be attached. Retractile springs 63 hold the operating levers 56, 56ᵃ, 57 and 57ᵃ normally in a position in which the complementary clutch members do not cooperate. When any cooperating clutch member engages its winding drum to rotate the same, the drum may be held in a partially or fully wound position by means of spring pressed pawls 65, 65ᵃ, 65ᵇ and 65ᶜ cooperating with the ratchets 66 fixed on each winding drum. Releasing rods 67, 67ᵃ, 67ᵇ and 67ᶜ also leading to the driver's or operator's position are provided for releasing the pawl in order that any one of the winding drums may be unwound as much as desired.

Two-way plows have been known and used for many years, but they have not proven entirely satisfactory because it has been impossible with the constructions heretofore known to keep the center of resistance of both plowing units, when each is in operative position, in a common line of draft; in other words, the construction has been such that shifting from one plowing unit to the other shifted the line of draft laterally with reference to the point of application of the draft to the plow, whereas the best results are obtained by maintaining the line of draft constantly in a longitudinal vertical plane coincident with the center of power of the tractor or other drawing means. To accomplish this in a two-way plow it is necessary, as above indicated, that the center of resistance of whichever plowing unit is in service coincide with such line of draft, and in prior constructions this could not be done because the two plowing units were placed at opposite sides of such center line and were arranged to move up and down in parallel vertical planes in fixed relation to the frame and its supporting wheels. My invention, however, provides for bringing the center of resistance of either unit when in operation into coincidence with a common central line of draft, and maintaining it in such position, as will be readily understood from the following description of the operation thereof.

In operation, to adjust the plow in order that one set or gang of plows, for instance the right hand set, may be in proper working position, the handle 45 is moved to cooperate with the right hand notch as indicated, thereby turning the side wheels 37 and 38 about their pivots 40 to direct them toward the left in parallelism with each other.

The right hand gang having been lowered to its operative position, if the machine is being drawn during this operation, by reason of the location of the center of resistance at the right hand side of the median line of the plow, which temporarily deflects the line of draft laterally in that direction, the force of the draft will swing the main frame laterally about the single point of attachment 22, carrying it to the angular position shown in Fig. 1, so that the wheel 37 will be moved ahead of the wheel 38 and both wheels will be restored to parallelism with the line of advance, and with the center line of draft, with which the point of attachment 22 and the center of resistance of the operating plow unit will then aline. Thus a single shifting means is provided for the frame, plows, and the wheels. With the left wheel 37 disposed ahead of the wheel 38 in the position shown, the driving gear 51 of the left wheel is then in cooperation with the left hand driven gear 52 so that the adjusting shaft 53 is driven thereby. The height of the wheels, which determines the depth of the furrow, may be adjusted either before or after the plow is in cooperation with the ground as may be desired. To lower either wheel, which is equivalent to raising the main frame and operative plow, the sliding lever 57 or 57[a] may be moved into cooperation with whichever winding drum 55 is desired to be operated when the cable 60 will be wound and wheel adjusted relative to the main frame the desired amount, after which the operating lever 57 or 57[a] may be released to disengage the co-operating clutch members.

At the end of the furrow should it be desired to operate with the other gang, the set of plows 12 and 13 may be elevated to an inoperative position by operation of a lever 56[a] to wind the appropriate drum 54 the desired amount. To lower either set of plows the pawl releasing rod 67[a] or 67[b] may be operated to release the pawl or ratchet and allow the desired drum 54 to unwind. In the same way operating the rods 67 or 67[c] releases the pawl and ratchet of the desired winding drum 55. It will be seen that if the machine is in motion, by operating the handle 45 to turn the steering wheels toward a position of parallelism with the deflected line of draft incident to the lowering of either gang to operative position, by the force of the draft the main frame, fore frame, and both wheels will move laterally, turning about the single point of attachment 22 as a pivot, to carry the center of resistance of the operating gang into substantial coincidence with the normal central line of draft and restore the steering wheels to parallelism with the line of advance.

Among the advantages of my device may be enumerated the ease of alining the operating plows and drawing force by the operation of the single adjusting handle 45, which by steering the dirigible wheels as described, facilitates the lateral movement of the operating gang by the force of the draft into a position of alinement with the normal central line of draft, and not only restores the dirigible wheels to a position of parallelism with the line of advance but at the same time moves the land wheel ahead of the other for a better distribution of forces within the plow frame and a better guiding of the machine.

When the sets or gangs are disposed at a fixed horizontal oblique angle to each other, an advantageous lateral space economy results since the inoperative plow is then disposed back of the wheel on the land side in an out of the way position instead of being placed above or at the side of the working plow. The ease of adjustment of the depth of the furrow by adjusting the height of each wheel independently of the other, which adjustment is accomplished from the rotation of the side wheels of the machine when in motion is another noteworthy feature. Also the fact that either set of plows may be retracted to an inoperative position by the same adjusting shaft 53, driven from one of the side wheels is a further advantage. With the plows arranged at a fixed horizontal angle with one another, a rigid and substantial frame results for the two-way plows. One of the most noteworthy features of my invention is the single point of attachment 22 in fixed angular relation to the two plows for applying the drawing force to each plow, while the wheels, plowing units and main frame are movable under the force of the draft to carry the center of resistance of the operating unit into the normal central line of draft, and maintain it in such position while it continues in operation. Having the point of attachment 22 fixed relative to the two plows enables a lighter frame to be used and yet affords the necessary rigidity.

Although I have shown and described the invention embodied in a two-way gang plow, it will be readily seen that either set or gang of plows may be regarded as a single tool so that the term tool as used in the claims refers to one of the two-way plows which may be either a single plow or a gang.

I claim as my invention:

1. In an agricultural implement a plurality of separately operable ground tools, a pair of parallel supporting wheels for said tools, mechanism operable by either wheel for raising or lowering one of said wheels relative to the other, a second mechanism operable by the same wheel as the first mentioned mechanism for raising each tool from cooperation with the ground to an inoperative position, attaching means for a drawing force for the implement and a device for moving the operating tool about the attaching means into alinement with the drawing force.

2. In a two way plow, a frame carried on front dirigible wheels and a rear supporting wheel, a forwardly converging draft connection swingable vertically on said frame, rearwardly diverging plow beam structures attached to the front end of said draft connection to swing vertically and means for independently raising and lowering said plow beam structures.

3. In a two way plow, a frame carried on front dirigible wheels and a rear supporting wheel, a forwardly converging draft connection swingable vertically on said frame, rearwardly diverging plow beam structures each having forwardly converging beams attached to the front end of said draft connection to swing vertically and means for independently raising and lowering said plow beam structures.

4. In a two way plow, a frame carried on front dirigible wheels and a rear supporting wheel, a forwardly converging draft connection swingable vertically on said frame, rearwardly diverging plow beam structures attached to the front end of said draft connection to swing vertically, means for independently raising and lowering said plow beam structures, and means for simultaneously steering the front supporting wheels.

5. In a two way plow, a frame carried on front dirigible wheels, said wheels being arranged for vertical adjustment relative to the frame and independently of each other, a forwardly converging draft connection swingable vertically on said frame, rearwardly diverging plow beam structures attached to the front end of said draft connection to swing vertically and means for independently raising and lowering said plow beam structures and holding the same in adjusted position.

6. In a two way plow, a frame carried on front dirigible wheels and a rear supporting wheel, a forwardly converging draft connection swingable vertically on said frame, rearwardly diverging plow beam structures attached to the front end of said draft connection to swing vertically, a vertical guide for each of said plow beam structures and means for independently raising and lowering said plow beam structures.

7. In a two way plow, a pair of wheels, a frame member mounted between said wheels, connections between said member and the wheels permitting the latter to be adjusted to different angular positions with respect to said member, means for effecting such adjustment, a frame extending forwardly from said member, a draft connection on the front of said frame adapted to occupy a position at one side of the median line between said wheels when said member is disposed at an angle to the axis of either wheel, a rear frame connected with said member, a pair of plow carrying frames adapted to be guided vertically upon said rear frame and converging forwardly and having their front ends secured to said draft connection, and means for effecting independent raising or lowering of said plow carrying frames.

8. In a two way plow, a pair of wheels, a frame member mounted between said wheels, connections between said member and the wheels permitting the latter to be adjusted to different angular positions with respect to said member, means for effecting such adjustment, a frame extending forwardly from said member, a draft connection on the front of said frame adapted to occupy a position at one side of the median line between said wheels when said member is disposed at an angle to the axis of either wheel, a rear frame connected with said member, a pair of plow carrying frames adapted to be guided vertically upon said rear frame and converging forwardly and having their front ends secured to said draft connection, and means adapted to be actuated by each wheel for raising one of said plow carrying frames.

9. In a two way plow, a pair of dirigible wheels, a frame connecting said wheels and projecting forwardly and rearwardly thereof, means for simultaneously steering said wheels, said steering means serving to effect relative adjustment between the wheels and frame whereby the former will occupy predetermined angular positions with respect to the frame, a draft connection on the front of the frame, forwardly converging plow carrying frames inclined to the axis of the wheels and adapted to be guided vertically upon the rear portion of the frame and having their front ends pivotally engaging a portion of said draft connection, and means for independently raising said plow carrying frames.

10. In a two way plow a pair of dirigible wheels, a frame connecting said wheels and projecting forwardly and rearwardly thereof, the wheels being vertically adjustable relative to the frame and to each other, means for simultaneously steering said wheels, said steering means serving to effect relative angular adjustment between the wheels and frame whereby the latter will occupy predetermined angular positions with respect to the frame, a draft connection on the front of the frame, forwardly converging plow carrying frames inclined to the axis of the wheels and adapted to be guided vertically upon the rear portion of the frame and having their front ends pivotally engaging a portion of said draft connection, and means for independently raising said plow carrying frames.

11. In a two way plow, a main frame, dirigible wheels for supporting said frame, steering means for simultaneously effecting relative angular adjustment between the wheels and frame, a draft attachment at the front end of the frame, separate forwardly converging plow carrying frames connected with said draft attachment to swing vertically thereon, vertical guide means for the plow carrying frames, means including a shaft connected with said plow carrying frames to effect raising of the same and means for coupling either wheel with said shaft to effect rotation of the latter during advancement of the machine.

12. A two-way plow comprising a dirigible wheel supported frame, two oppositely acting rearwardly divergent gangs movable alternately into or out of operative position, means for supporting either of said gangs out of operative position, and a draft member in fixed lateral relation to said frame for connecting said frame and gangs with suitable hauling means to swing laterally relatively thereto in either direction from a normally central trailing position, under the force of the draft, when either gang is lowered to operative position.

13. A two-way plow comprising two oppositely acting gangs movable alternately into operative position and arranged at opposite sides of a normal central line of draft, a draft member connected with said gangs in fixed lateral relation thereto, and adapted to be connected with a tractor to swing laterally with respect to the line of advance, under the force of the draft, when either gang is lowered to operative position, and a dirigible wheel supported frame for supporting said gangs.

14. A two-way plow comprising two oppositely acting gangs movable alternately into operative position and arranged at opposite sides of a normal central line of draft, a centrally located draft member in fixed lateral relation to said gangs and adapted to be connected with a tractor to swing laterally with respect to the line of advance, under the force of the draft, when either gang is lowered to operative position, a transversely extending frame connected with said draft member for supporting said gangs, dirigible wheels supporting the opposite ends of said frame, and means for steering said wheels in parallelism with each other.

15. A two-way plow comprising two oppositely acting rearwardly divergent gangs in fixed angular relation to each other, said gangs being movable alternately into operative position and arranged at opposite sides of a normal central line of draft, a centrally located draft member connected with said gangs in fixed lateral relation thereto and adapted to be connected with a tractor to swing laterally with respect to the line of advance, under the force of the draft, when either gang is lowered to operative position, a transversely extending frame connected with said draft member to swing laterally therewith, and adapted to support said gangs in inoperative position, and dirigible wheels supporting the end portions of said frame.

16. A two-way plow comprising two oppositely acting rearwardly divergent gangs in fixed angular relation to each other, said gangs being movable alternately into operative position and arranged at opposite sides of a normal central line of draft, a centrally located draft member connected with said gangs in fixed lateral relation thereto and adapted to be connected with a tractor to swing laterally with respect to the line of advance, under the force of the draft, when either gang is lowered to operative position, a transversely extending frame connected with said gangs to swing laterally therewith, dirigible wheels supporting the end portions of said frame, and means for holding said wheels in parallelism with each other.

17. A two-way plow comprising a dirigible wheel supported frame, two oppositely acting forwardly converging gangs connected with said frame in fixed angular relation to each other, said gangs being movable alternately into operative position, and a draft connection located substantially at the point of convergence of said gangs and adapted to be connected with a tractor to permit said frame and gangs to swing laterally with respect to the line of advance, under the force of the draft, when either gang is lowered to operative position.

18. A two-way plow comprising two oppositely acting gangs movable alternately into operative position, and arranged at opposite sides of a central normal line of draft, means mounted on dirigible wheels for supporting either gang out of operative position, and a centrally located draft connection for applying a drawing force to both of said gangs, arranged to permit either gang to move laterally with respect to the line of advance, under the force of the draft, when such gang is lowered to operative position.

19. A two-way plow comprising a transversely extending main frame, dirigible wheels at the ends thereof, two oppositely acting gangs movable alternately into operative position and arranged at opposite sides of a central normal line of draft, means for supporting either gang on said frame out of operative position, and an attaching member in fixed lateral relation to said gangs and frame and located in a line lying substantially midway between said gangs, said attaching member being adapted to be connected with a tractor to swing laterally and turn the frame angularly with respect to the line of advance, under the force of the draft, when either gang is lowered to operative position, to apply drawing force to said frame and to both of said gangs.

20. A two-way plow comprising a main frame, dirigible wheels at the sides thereof, two oppositely acting rearwardly divergent gangs in fixed angular relation to said frame and to each other, and movable alternately into operative position and arranged at opposite sides of a central normal line of draft, means for supporting either gang on said frame out of operative position, and an attaching member in fixed angular relation to said gangs and located in a line lying substantially midway between the same, said attaching member being adapted to be connected with a tractor to swing laterally with respect to the line of advance, under the force of the draft, when either gang is lowered to operative position, to apply drawing force to said frame and to both of said gangs.

21. A two-way plow comprising a frame having parallel dirigible wheels, two rearwardly divergent gangs at opposite sides of the longitudinal center line of the plow and in fixed angular relation to each other, said gangs being movable alternately into operative position, means for supporting either gang on said frame out of operative position, a draft member connected with said frame and with said gangs in laterally rigid relation thereto, and adapted to be connected with a tractor substantially in the center line of the plow, said draft member being movable laterally with respect to the line of advance, by the force of the draft, when either gang is lowered to operative position, and means for steering said wheels in parallelism with each other.

22. A two-way plow comprising two oppositely acting gangs located at opposite sides of the longitudinal center line of the plow and movable alternately into operative position, a dirigible wheel supported frame for supporting either or both of said gangs out of operative position, and means having a laterally rigid connection with said frame and extending forward therefrom, for connecting said frame and gangs with suitable hauling means to swing laterally relatively thereto, under the force of forward draft, when either gang is lowered to operative position.

23. A two-way plow comprising two oppositely acting gangs located at opposite sides of the longitudinal center line of the plow and movable alternately in rearwardly divergent vertical planes into operative position, a dirigible wheel supported frame for supporting either or both of said gangs out of operative position, and means having a laterally rigid connection with said frame and extending forward therefrom, for connecting said frame and gangs with suitable hauling means to swing laterally relatively thereto, under the force of forward draft, when either gang is lowered to operative position.

24. A two-way plow comprising a frame, dirigible ground wheels at opposite sides of said frame for supporting the same, a caster wheel supporting said frame at the rear, oppositely acting gangs connected with said frame for alternate movement into or out of operative position, means for supporting either of said gangs out of operative position, a hitch device for connecting the plow with suitable hauling means to swing laterally relatively thereto under the force of forward draft in either direction from a normally central trailing position, and means for controlling the position of said dirigible wheels.

25. A two-way plow comprising a transversely disposed frame, ground wheels at opposite sides of said frame and a rear caster wheel for supporting said frame, oppositely acting rearwardly divergent gangs connected with said frame in fixed angular relation to each other for alternate movement into or out of operative position, means for supporting either of said gangs out of operative position, and a hitch device located forward of the frame and substantially in the longitudinal center line of the plow for connecting the plow with suitable hauling means to swing laterally relatively thereto under the force of the forward draft, in either direction from a normally central trailing position.

26. A two-way plow comprising two oppositely acting rearwardly divergent gangs movable alternately into operative position, a frame for supporting either or both of said gangs out of operative position, dirigible wheels at opposite sides of said frame, separately operable lifting means carried by said frame and adapted to be actuated by said wheels, respectively, to lift either gang out of operative position, means for connecting said frame and gangs with suitable hauling means to swing laterally relatively thereto under the force of the forward draft, when either gang is lowered to operative position, and means for steering said wheels.

27. A two-way plow comprising two oppositely acting rearwardly divergent gangs movable alternately into operative position, a frame for supporting either or both of said gangs out of operative position, dirigible wheels at opposite sides of said frame, separately operable lifting means carried by said frame and adapted to be actuated by said wheels, respectively, to lift either gang out of operative position, a hitch device located substantially in the longitudinal center line of the plow for connecting said frame and gangs with suitable hauling means to swing laterally relatively thereto under the force of the forward draft, when either gang is lowered to operative position, and means for steering said wheels.

28. A two-way plow comprising a transversely disposed frame, dirigible wheels at opposite sides thereof, two oppositely acting gangs separately movable in rearwardly divergent vertical planes into operative position, means for supporting either gang on said frame out of operating position, means for steering said wheels in parallelism with each other, and a draft member extending forward from and connected with said frame and with said gangs, in laterally rigid relation thereto with respect to the line of advance, and adapted to be connected substantially in the center line of the plow with suitable hauling means.

29. A two-way plow comprising two oppositely acting gangs separately movable in rearwardly divergent planes into operative position, a transversely disposed frame, ground engaging means supporting said frame at the rear, dirigible wheels at opposite sides of said frame, means for supporting either of said gangs on said frame out of operative position, means for steering said wheels in parallelism with each other, and a vertically swinging draft member extending forward from and connected with said frame and with said gangs, in laterally rigid relation thereto with respect to the line of advance, and adapted to be connected substantially in the center line of the plow with suitable hauling means.

30. A two-way plow comprising two oppositely acting gangs separately movable in rearwardly divergent vertical planes into operative position, a frame, dirigible wheels at opposite sides of said frame, means for supporting either of said gangs on said frame out of operative position, means for steering said wheels in parallelism with each other, a caster wheel supporting said frame at the rear, and means for connecting said frame and gangs with suitable hauling means to swing laterally in either direction from a normally central trailing position, whereby, by the force of forward draft, when either gang is in operative position, the center of resistance of such gang will move into substantial coincidence with a common line of draft.

31. A two-way plow comprising a frame, dirigible wheels at opposite sides thereof, two oppositely acting gangs movable alternately into operative position, means for supporting either gang on said frame out of operative position, steering means for said wheels, draft means for said gangs movable laterally with respect to the line of advance by the force of the forward draft when either gang is lowered to operative position, separately operable lifting means for lifting either gang out of operative position, and traction operated means for operating said lifting means separately.

32. A two-way plow comprising a frame, dirigible wheels at opposite sides thereof, two oppositely acting rearwardly divergent gangs movable alternately into operative position, means for supporting either gang on said frame out of operative position, steering means for said wheels, draft means for said gangs movable laterally with respect to the line of advance by the force of the forward draft when either gang is lowered to operative position, separately operable lifting means for lifting either gang out of operative position, and traction operated means for operating said lifting means separately.

33. A two-way plow comprising a frame, dirigible wheels at opposite sides thereof, two oppositely acting gangs movable alternately into operative position, means for supporting either gang on said frame out of operative position, steering means for said wheels, draft means for said gangs movable laterally by the force of the draft when either gang is in operative position, to cause the center of resistance of such gang to move into substantial coincidence with a common line to draft, and separately operable lifting means operated respectively by said wheels for lifting either gang out of operative position.

34. A two-way plow comprising a frame, dirigible wheels at opposite sides thereof, two oppositely acting rearwardly divergent gangs movable alternately into operative position, means for supporting either gang on said frame out of operative position, steering means for said wheels, draft means for said gangs movable laterally by the force of the draft when either gang is in operative position, to cause the center of resistance of such gang to move into substantial coincidence with a common line of draft, and separately operable lifting means adapted to be operated respectively by said wheels for lifting either gang out of operative position.

35. A two-way plow comprising two oppositely acting rearwardly divergent gangs movable alternately into operative position, a frame for supporting either of said gangs out of operative position, ground wheels pivotally mounted at opposite sides of said frame to turn angularly relatively thereto in unison for supporting and guiding the same, separately operable lifting means carried by said frame for lifting either gang out of operative position, separate means operable respectively by said ground wheels for operating said lifting means respectively, and means for connecting said frame and gangs with suitable hauling means to swing laterally relatively thereto in either direction from a normally central trailing position.

36. A two-way plow comprising two oppositely acting rearwardly divergent gangs movable alternately into operative position, a frame for supporting either of said gangs out of operative position, ground wheels pivotally mounted at opposite sides of said frame to turn angularly relatively thereto in unison for supporting and guiding the same, separately operable lifting means carried by said frame for lifting either gang out of operative position, separate means operable respectively by said ground wheels for operating said lifting means respectively, a wheel supporting said frame at the rear, and means for connecting said frame and gangs with suitable hauling means to swing laterally relatively thereto in either direction from a normally central trailing position.

37. A two-way plow comprising two oppositely acting rearwardly divergent gangs movable alternately into operative position, a frame in fixed angular relation to said gangs, for supporting either of said gangs out of operative position, ground wheels at opposite sides of said frame and connected therewith to turn angularly with respect thereto, means for holding said wheels in parallelism with each other, a centrally located draft connection for connecting said frame and gangs with suitable hauling means to swing laterally relatively thereto in either direction from a normally central trailing position, and means for turning said wheels into substantial parallelism with the line of draft when either gang is operating.

38. A two-way plow comprising two oppositely acting rearwardly divergent gangs movable alternately into operative position, a frame in fixed angular relation to said gangs, for supporting either of said gangs out of operative position, ground wheels at opposite sides of said frame and connected therewith to turn angularly with respect thereto, means for holding said wheels in parallelism with each other, a centrally located draft connection extending forward of said frame and wheels, for connecting said frame and gangs with suitable hauling means to swing laterally relatively thereto in either direction from a normally central trailing position, and means for turning said wheels into substantial parallelism with the line of draft, when either gang is operating.

39. A two-way plow comprising two oppositely acting gangs movable alternately into operative position, a frame for supporting either of said gangs out of operating position, dirigible ground wheels at opposite sides of said frame for supporting the same, separately operable lifting means carried by said frame for lifting either gang out of operative position, power transmitting means associated with each of said wheels to turn angularly therewith, and connections operated respectively by said power transmitting means for operating said lifting means respectively.

40. A two-way plow comprising a frame including a rearwardly disposed transverse arch member, a draft member connected therewith in fixed angular relation thereto, and adapted to be connected with hauling means to swing laterally with respect to the line of advance, ground wheels pivotally connected with the opposite end portions of said arch element to swing angularly relatively thereto about vertical axes, rearwardly divergent gangs pivotally connected with said draft member to swing vertically in fixed angular relation to each other, means carried by said frame for supporting either gang out of operative position, and means for normally holding said ground wheels in substantial parallelism with the line of advance.

41. A two-way plow comprising a frame including a rearwardly disposed transverse arch member, a draft member connected therewith, and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, means carried by said frame for supporting either gang out of operative position, and means for normally holding said ground wheels in substantial parallelism with the line of advance, and operable to turn said wheels toward a position of parallelism with the line of draft when such line of draft is deflected laterally by the lowering of either gang into operative position.

42. A two-way plow comprising a frame including a rearwardly disposed transverse arch member, a draft member connected therewith, and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, lifting devices on said frame separately operable to lift either gang out of operative position, means carried by said frame for supporting either gang out of operative position, means for normally holding said ground wheels in substantial parallelism with the line of advance, and separate devices operable by said wheels respectively for respectively actuating said lifting devices.

43. A two-way plow comprising a frame including a rearwardly disposed transverse arch member, a draft member connected therewith, and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, lifting devices on said frame separately operable to lift either gang out of operative position, means carried by said frame for supporting either gang out of operative position, means for normally holding said ground wheels in substantial parallelism with the line of advance, and operable to turn said wheels toward a position of parallelism with the line of draft when such line of draft is deflected laterally by the lowering of either gang into operative position, and separate devices operable by said wheels respectively for respectively actuating said lifting devices.

44. A power lift agricultural implement comprising a frame, a tool connected therewith, lifting devices on said frame operable to lift said tool, a dirigible ground wheel connected with said frame for angular movement with respect to said lifting devices, means for steering said wheel, and means adapted to turn angularly with said wheel into or out of operative connection with said lifting devices, and operable by said ground wheel to actuate said lifting devices.

45. A power lift agricultural implement comprising a frame, a tool connected therewith, lifting devices, including power transmitting means, on said frame operable to lift said tool, a dirigible ground wheel connected with said frame for angular movement with respect to said lifting devices, means for steering said wheel, and means movable angularly with said wheel into or out of operative engagement with said power transmitting means, and operable by said wheel to actuate said lifting devices.

46. A power lift agricultural implement comprising a frame, a tool connected therewith, lifting devices on said frame operable to lift said tool, including clutch controlled power transmitting means, a dirigible ground wheel connected with said frame for angular movement with respect to said lifting devices, means for steering said wheel, and means associated with said ground wheel to turn angularly therewith into or out of operative engagement with said power transmitting means, and operable by said wheel to actuate said lifting devices.

47. A two-way plow comprising a frame, oppositely acting rearwardly diverging gangs connected with said frame for alternate movement into or out of operative position, means for connecting the frame with suitable hauling means to swing laterally relatively thereto in either direction from a normally central trailing position, whereby when either gang is moved to operative position said frame may swing laterally to bring the center of resistance of such gang into substantial coincidence with a common line of draft, front dirigible wheels and a rear caster wheel for supporting said frame, and means for holding said front wheels in parallelism with each other.

48. A power lift agricultural implement comprising a frame, a tool connected therewith, lifting devices on said frame operable to lift said tool, a ground wheel connected with said frame for angular movement with respect thereto, power transmitting means actuated by said wheel and mounted to turn angularly therewith, and means, including clutch mechanism, operable by said power transmitting means to actuate said lifting devices.

49. An agricultural implement comprising a frame, a tool connected therewith, dirigible wheels at opposite sides of said frame for supporting the same and connected therewith to be raised or lowered relative to each other, mechanism operable by either wheel for raising or lowering one of said wheels relative to the other, and means operable by one of said wheels for raising the tool out of operative position.

50. An agricultural implement comprising a frame, a tool connected therewith, lifting devices on said frame operable to lift said tool, ground wheels connected with opposite sides of said frame for angular movement with respect thereto, and mechanism operable by either wheel for raising or lowering one of said wheels relative to the other.

51. An agricultural implement comprising a frame, a tool connected therewith, lifting devices on said frame operable to lift said tool, ground wheels connected with opposite sides of said frame for angular movement with respect thereto, mechanism operable by either wheel for raising or lowering one of said wheels relative to the other, and mechanism operable by one of said wheels for actuating said lifting devices.

52. A two-way plow comprising a frame, oppositely acting gangs connected with said frame for alternate movement into or out of operative position, dirigible wheels supporting said frame at the sides thereof and movable vertically with respect thereto to raise or lower the end portions of said frame, separately operable lifting devices for said gangs respectively and means operable by said wheels respectively to actuate the lifting devices associated with one or the other of said gangs.

53. An agricultural implement comprising a wheel supported frame, two oppositely acting plow bottoms, means connected with said frame for holding said plow bottoms at a forwardly converging angle to each other while permitting them to move alternately into operative position, and an attaching device in fixed lateral relation to said plow bottoms for attaching the implement to a suitable drawing element to swing laterally with respect to the line of advance under the force of the forward draft when either plow bottom is lowered to operative position, and means for angling the wheels of said frame.

54. An agricultural implement comprising a frame, two forwardly converging plow bottoms carried by the frame and adapted to be alternately placed in operative position, a draft member connected with said plow bottoms in fixed lateral relation to said frame for attaching said plow bottoms and frame to a suitable drawing element, and a pair of ground wheels having axles pivoted to the frame to turn angularly with respect to the line of advance, for supporting the same.

55. An agricultural implement comprising a frame, two forwardly converging plow bottoms adapted to be alternately placed in operative position, a draft member connected with said plow bottoms in fixed lateral relation to said frame, for attaching said plow bottoms and frame to a suitable drawing element, and wheels supporting the frame and shiftable into parallellism with either plow bottom when it is in operation.

56. A two-way plow comprising a frame, dirigible wheels supporting said frame, two oppositely acting forwardly converging gangs connected with said frame and movable alternately into operative position, means for supporting either of said gangs out of operative position, and means in fixed lateral relation to said frame for connecting said frame and gangs with suitable hauling means to swing laterally relatively thereto, with respect to the line of advance, in either direction from a normal central trailing position.

57. A two-way plow comprising two oppositely-acting forwardly converging gangs in fixed angular relation to each other, said gangs being movable alternately into operative position, means for supporting said gangs out of operative position comprising wheels movable into parallelism with either gang, and an attaching member located substantially at the point of convergence of said gangs and adapted to connect both of said gangs with a tractor to swing laterally with respect to the line of advance.

58. An agicultural implement comprising a frame, a tool connected therewith, ground wheels connected with opposite sides of said frame for angular movement with respect thereto, means for steering said wheels and mechanism operable by the traction of one of said wheels to move a side portion of the frame vertically.

59. An agricultural implement comprising a frame, a tool connected therewith, ground wheels connected with opposite sides of said frame for angular movement with respect thereto, means for steering said wheels and mechanism operable by the traction of either wheel to move one of said wheels vertically relative to the other.

60. An agricultural implement comprising a frame, a tool connected therewith, ground wheels connected with opposite sides of said frame for vertical sliding movement with respect thereto, means for steering said wheels and means operable by the traction of one of said wheels to vertically adjust a side portion of the frame with respect to the wheel adjacent thereto.

61. An agricultural implement comprising a frame, a tool connected therewith, ground wheels connected with opposite sides of said frame for angular and vertical movement with respect thereto, means for steering said wheels, and means operable by the traction of one of said wheels to vertically adjust a side portion of the frame with respect to the wheel adjacent thereto.

62. An agricultural implement comprising a frame, a tool connected therewith, ground wheels connected with opposite sides of said frame for relative vertical sliding movement on the frame with respect to each other, and means operable by one of said wheels to move the other wheel vertically on the frame relatively to the first wheel.

63. A two-way plow comprising a frame, oppositely acting gangs connected with said frame for alternate movement into or out of operative position, wheels supporting said frame at the sides thereof and movable vertically with respect thereto to raise or lower the side portions of said frame, separately operable lifting devices for said gangs, respectively, carried by the frame and operable to lift the gangs with respect thereto, and means operable by said wheels, respectively, to actuate said lifting devices.

64. A two-way plow comprising a frame, oppositely acting gangs connected with said frame for alternate movement into or out of operative position, dirigible wheels supporting said frame at the sides thereof, separately operable lifting devices for said gangs, respectively, and means operable by said wheels, respectively, to actuate the lifting devices associated with said gangs.

65. A two-way plow comprising a transversely extending frame member, a pair of side wheels supporting said frame member, forwardly extending draft attachment means connected with said transversely extending frame member, two oppositely acting plow bottoms adapted to move alternately into operative position, plow beams extending forwardly from said plow bottoms, means pivotally connecting each of said plow beams with said forwardly extending draft attachment means to permit said plow bottoms to swing into and out of operative position about a pivot axis extending substantially transversely of the plow, and means for effecting variation of the horizontal angular relation between the axes of said side wheels and the line of draft of the operative plow bottom when one or the other of said plow bottoms is lowered to operative position.

KENNETH C. LIVERMORE.